Jan. 18, 1966 D. W. REES 3,229,576
HYPERBOLIC ELLIPSOIDAL REAL TIME DISPLAY PANORAMIC
VIEWING INSTALLATION FOR VEHICLES
Filed Nov. 21, 1962 2 Sheets-Sheet 1

FIG. I

INVENTOR.
DONALD W. REES
BY S. J. Rotondi, A. J. Dupont
& C. R. White

INVENTOR.
DONALD W. REES

United States Patent Office 3,229,576
Patented Jan. 18, 1966

3,229,576
HYPERBOLIC ELLIPSOIDAL REAL TIME DISPLAY PANORAMIC VIEWING INSTALLATION FOR VEHICLES
Donald W. Rees, Warren, Mich., assignor to the United States of America as represented by the Secretary of the Army
Filed Nov. 21, 1962, Ser. No. 239,385
7 Claims. (Cl. 88—70)
(Granted under Title 35, U.S. Code (1952), sec. 266)

This invention described herein may be manufactured and used by or for the Government for governmental purposes without the payment to me of any royalty thereon.

This invention relates in general to panoramic viewing installations and in particular to panoramic viewing installations in vehicles utilizing hyperbolic ellipsoidal reflecting optics in vehicles which provide a vehicle operator or observer with a 360 degree real time display.

Since prior art vision blocks, periscopes and other optical viewing systems in vehicles have heretofore provided only an extremely limited field of view, the driver of the vehicle had to be located at the front of the vehicle near an overhead access hatch so that the vehicle might be driven at times by direct view with the driver's head exposed to obtain a wider field of view. However, due to the general shape of such vehicles and the forward location of the driver, the operator's field of view, even with his head extending outside the vehicle is still seriously hampered. In most cases, the exposed driver can observe only the terrain in front of the vehicle. Furthermore, while driving with the body so exposed, the driver is extremely vulnerable to gun fire or other similar adverse action. Such limited viewing, both direct and indirect, contributed to vehicle maneuvering errors and enable enemy personnel and vehicles to approach the vehicle without being observed.

It is therefore an object of this invention to provide an optical viewing system for vehicles which allows the vehicle operator a full 360 degree real time display.

Another object of the invention is to provide a vehicle operator with a 360 degree optical viewing system which eliminates the necessity of direct viewing.

A further object of the invention is to provide an optical panoramic viewing structure in vehicles which provides an increased field of view of the area outside the vehicle.

A further object of this invention is to provide an optical viewing system in vehicles which improves ballistic, contamination, and radiological protection by eliminating the necessity of viewing blocks and periscopes in the vehicle armor and direct viewing with the body exposed.

Another object of the invention is to provide an indirect panoramic viewing system in vehicles which will allow operator placement in any area of the vehicle hull convenient to vehicle design.

These and other objects of the invention will become apparent from the following specification and drawings wherein.

Figure 1:
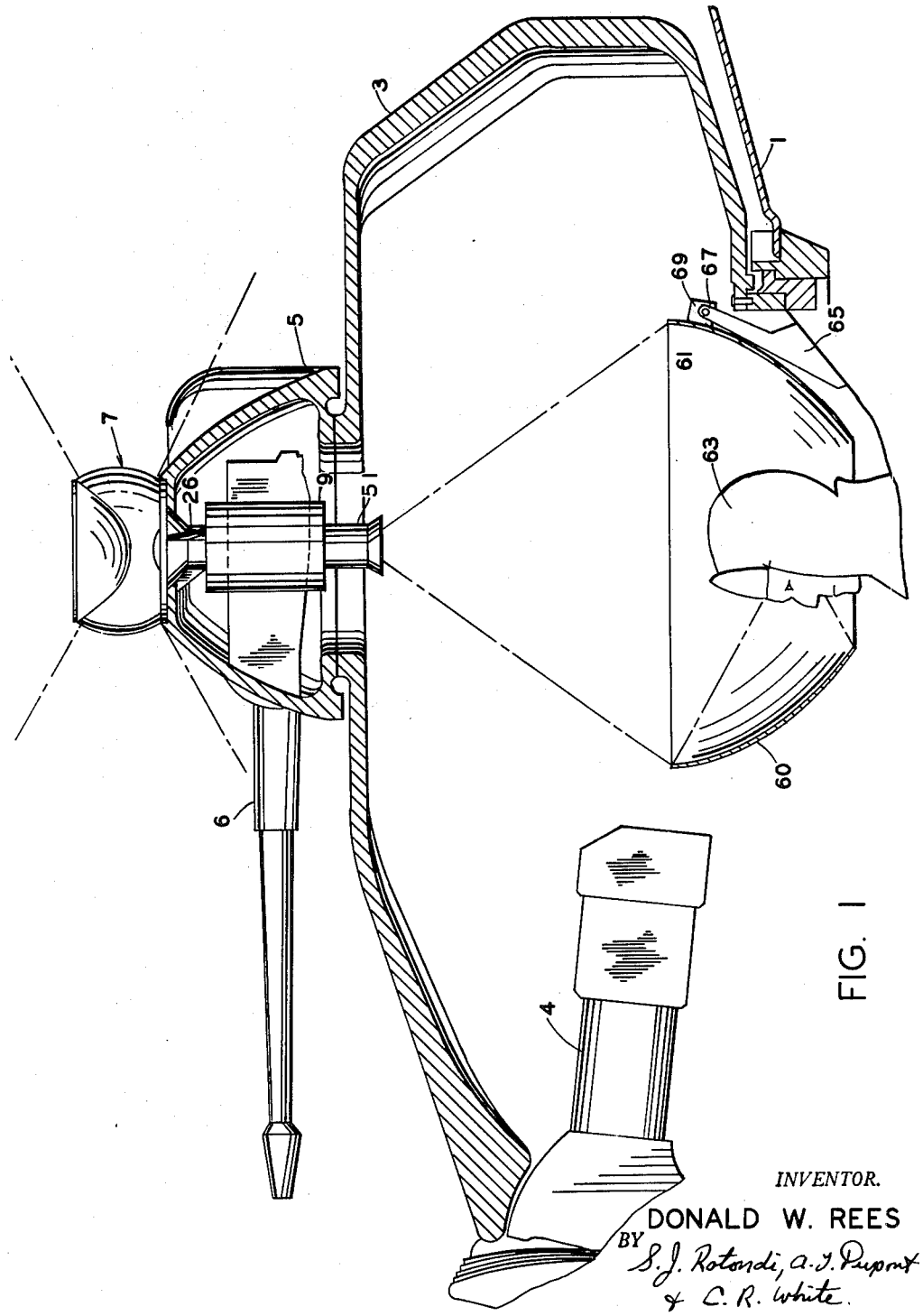
FIG. 1 is a diagrammatical sectional view of a closed pod vehicle showing the components of the panoric viewing installation with the vehicle operator in position to drive the vehicle.
Figure 2:
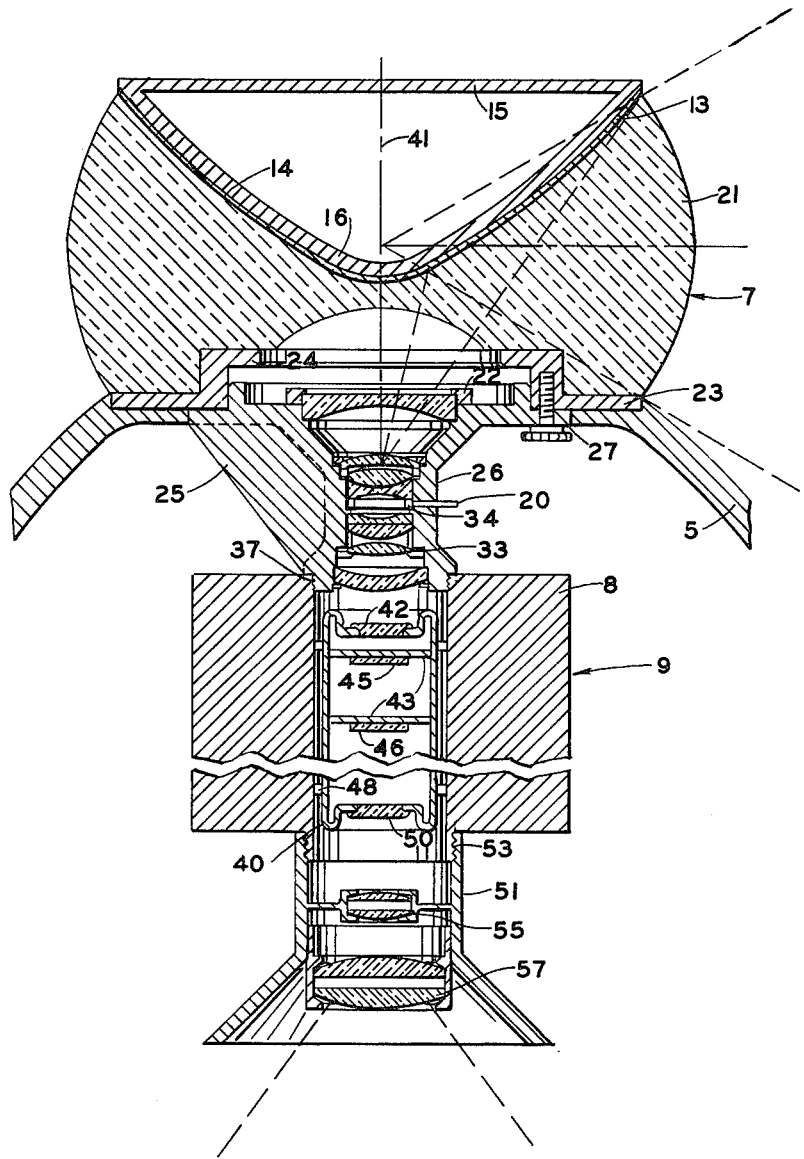
FIG. 2 is an enlarged vertical cross sectional view of the upper components of the viewing installation of FIG. 1.

Referring more particularly to the drawings wherein like reference characters refer to like parts, there is shown in FIG. 1 a closed pod tracked vehicle 1 such as a battle tank which has a conventional rotatable closed turret 3 for housing and traversing the main armament 4. The turret also accommodates a closed remotely controlled cupola 5 which in turn supports automatic weapon 6. For viewing outside the vehicle, there is secured in the upper portion of the cupola an image collector 7 which is shown in detail in FIG. 2. This collector is formed by a reflecting surface or mirror 13 in the shape of a hyperboloid. This surface is formed by silvering or aluminizing the upper surface 14 which forms a hyperbolic concavity in support 21. Surface 13 can be overcoated with a coating of suitable protective material. Support 21 is of a suitable transparent material such as glass or plastic. To protect the surface 13 a conforming hyperbolic insert 16 with a flat circular top 15 may be placed on top of the support 21 and secured thereto by bonding or threaded fasteners. A circular inset 23, preferably of stainless steel, with offset shoulder portion 24, that has a central circular portion removed, is securely bonded to the lower portion of support 21. Secured to the inset 23 by screw devices 27 is a tubular lens holder 26. In this holder a plurality of optically coupled lens elements 33, fixedly mounted therein by holding rings 22, cooperate to form a wide angle lens. Iris diaphragm 34 mounted in the lens holder controls the amount of light permitted through the wide angle lens. Rotatable iris diaphragm control element 20 can be manually controlled from the interior of the vehicle or automatically controlled from the vehicle exterior by a transducer operating a servomotor to rotate the control 20 to vary the diameter of the iris diaphragm opening. The outer focus of the hyperbolic mirror is made to coincide with the optical center of the wide angle lens. The lens holder 26 is rigidly secured to the cupola by gussets 25.

Connected by threads 37 on the opposite end of the lens holder 26 is a light amplifying device 9. Included in device 9 is a cylindrical image intensifier or image converter tube 40 positioned with its longitudinal axis aligned with the optical axis 41 of the wide angle lens. Intensifier tube 40 has a plurality of photocathodes and phosphor output screens. The first photocathode 42 is positioned at the focal point of the wide angle lens so that the image transmitted from the hyperbolic mirror 13 will be in focus on the photocathode 42. The first photocathode emits electrons substantially in the image pattern received. These electrons are accelerated by anode structure (not shown) onto a first fine-grain, aluminized, phosphor output screen 43. The first phosphor output screen 43 converts the electrons into the image originally striking surface 42 but with increased brightness. This image registers on a second photocathode 45 and is, in turn, converted to electrons and accelerated by a second anode (not shown) onto a second phosphor output screen 43. The resulting image on the second phosphor screen 43 is brighter than that on the first phosphor screen. To further intensify the image, a third photocathode 46 converts the light rays which form the image on the second screen 43 into electrons that are accelerated in a similar manner as mentioned above onto phosphor output screen 50. The resulting image on screen 50 is correspondingly brighter than the image produced on the other phosphor screens. Surrounding tube 40 is a cylindrical field magnet 8 which forms part of the amplifying device 9. The field of this magnet focuses the electrons emitted by the photocathode screens onto the phosphor output screens. Thus, the field magnet prevents electron stray and insures that the brighter image produced on face 50 is not unduly distorted and is substantially identical to that formed on the input surface 42. Resilient ring-like spacers 48—48 space and securely hold tube 40 in the field magnet.

Although I have described a particular type image intensifier, it is to be understood that this is for illustration only and that other types and modifications thereof can be used for the same purpose. Thus, similar image intensifiers such as that described in U.S. Patent No. 2,857,523 or RCA publication 4449 dated September 1962 may be substituted for the one described above, the only requirement being the production of an image on the output surface with a significant gain in image intensity for a purpose hereinafter described.

A funnel-shaped housing 51 is threadedly connected to the lower external portion 53 of the field magnet. In this housing are lens elements 55–57 which provide a projection lens. The projection lens projects the intensified image onto the viewing screen 60 situated in the vehicle body. As will be seen from FIG. 1, the viewing screen 60 forms a portion of an ellipse of revolution and is in the form of a cup-like hollow shell with the bottom removed in order to provide access for the viewer's head 63. The screen can be of a suitable light weight material such as aluminum. The elliptical interior viewing surface 61 of the screen is coated with a suitable light diffusing material such as a white flat paint or any suitable substance having a high reflectivity. Since the screen shape is the inverse of that of the reflector, the image distortion produced by the hyperbolic reflector will be corrected by the elliptical shaped screen. Furthermore, since the image collector collects and reflects views from all around the vehicle onto the interior surface of the screen a 360 degree real time display is exhibited on the screen. The vehicle operator can merely by moving his head and eyes view the scene surrounding the vehicle. Thus, if an operator desires to observe the view behind the vehicle he simply moves his head to the rear and observes the image on the screen behind him. The screen 60 is held in the interior of the vehicle by cantilever 65 fixed in the vehicle. Horizontal pivot 67 through tabs 69 allows the operator to rotate the ellipsoidal screen to facilitate operator ingress and egress.

It is anticipated that the operator's seat can be pivotally mounted to the floor so that the seat can be rotated if desired. This permits the operator to view the screen without excess head movement.

The image to be observed by the panoramic viewing device enters the system by way of the hyperbolic image collector. The mirror creates a transformed virtual image of the surrounding scene. Horizontal objects in the scene are transformed to appear as curved images in the mirror concentric about the mirror's center while upright or vertical objects appear as radial images. The transformed virtual image is then converted to a real image reduced in size and shaped to conform to the input surface 42 of the light amplifier by the use of the wide angle lens. The optical center of the wide angle lens is coincident with the outer focus of the mirror. The lens focus and depth of field must be such that the image on the mirror appears in its entirety and in focus on the input face of the light amplifier.

The light amplifier is used to overcome light losses to the system due to lens inefficiencies and image magnification. It is able to accept image at its input and reproduce it with sufficient brightness and resolution to enable projection by lenses 55 and 57. The projection lenses 55–57 relay the image from the output of the light amplifier to the surface of the elliptical viewing screen. In order to produce an undistorted image on the viewing screen, this lens must have a focal length equal to that of the wide angle lens connected to the hyperbolic mirror. It must also have a field curvature coincident with the surface of the viewing screen. The internal surface of the viewing screen must be of elliptical configuration. To contain an undistorted image, the eccentricity of the ellipse must be reciprocal of the eccentricity of the hyperbolic reflector. The outer focus of the elliptical screen must also coincide with the optical center of the projector lens.

The elliptical screen is then viewed from the area of inner focus of the ellipse. The image observed from this position is identical to that entering the system through the hyperbolic image collector.

Summary

Although I have described in particularity one application of my invention as applied on a particular vehicle, it will be appreciated that the hyperbolic image collector can be mounted on any type vehicle in a manner as to give an unobstructed view of the area surrounding the vehicle. The virtual image on the hyperbolic mirror is relayed through the wide angle objective lens of the proper focal length to the photosensitive surface of a light amplifying device. The light amplifier increases the brightness of the incoming image and displays it on an output screen. This amplified image is projected into the interior surface of an elliptical viewing screen. The screen is then viewed by the vehicle operator positioned at the inner focus of the ellipse. The image observed by the vehicle operator is identical to that observed at the hyperbolic image collector. The view can be used for vehicle guidance or for observation purposes.

Devices other than the wide angle lens, image intensifier and projection lens may be used to transmit the image on the hyperbolic mirror to the elliptical viewing surface. Thus, the vertical image of the mirror can be picked up by a television camera mounted inside the cupola, using a wide angle lens. This image is conveyed to a closed circuit television projection system. A television projector fixed in the vehicle projects the image into the elliptical screen from the outer focus of the ellipse.

It is also anticipated that the image collector could be readily adapted to naval vessels, such as submarines, or be mounted in a remote controlled vehicle with a distant operator seated in the elliptical screen which would provide an ideal visual aid for operation and observation of the area surrounding the vehicle. The hyperbolic image collector could be used to observe remote areas such as storage depots, battlefields and highway complexes and used in forested areas to warn of fires. In the entertainment field, the system would provide a full field presentation for use with TV or motion pictures.

Having described my invention, I claim:

1. A viewing installation for producing a real time display used in vehicle guidance, said installation comprising a hyperbolic image collector, a wide angle lens optically coupled to said collector, the optical center of said wide angle lens being coincident with the outer focus of said hyperbolic image collector, an elliptical viewing screen having an eccentricity which is the reciprocal of the eccentricity of the image collector, an image intensification means having an input surface and an output surface, a projection lens having a focal length equal to the focal length of said wide angle lens, and wherein the field curvature is coincident with the surface of the elliptical viewing screen being disposed between the image intensification means and the elliptical screen to relay the output of the intensification means to the surface of the elliptical screen.

2. The installation as in claim 1 wherein the outer focus of the elliptical screen coincides with the optical center of the projection lens.

3. The installation as in claim 1 wherein the wide angle lens focus and depth of field are such that the image on the hyperbolic image collector appears in its entirety and in focus on the input face of the intensification means.

4. The system as defined in claim 1 wherein said image intensification means is an image intensifier tube.

5. Viewing structure for a vehicle operator positioned in the interior of a closed vehicle, said structure including a hyperbolic image collector mounted on the vehicle, a wide angle lens mounted in the vehicle below said image collector, an electronic image intensifier optically coupled to the wide angle lens, said intensifier having an input surface and an output surface, said input surface being positioned below said wide angle lens at a distance equal to the focal length of said lens, a projection lens having a focal length equal to that of said wide angle lens being optically coupled to said intensifier below the output surface thereof, a screen having an elliptical internal viewing surface secured in the vehicle and positioned below the projection lens, wherein the outer focus of said screen coincides with the optical center of said projection lens, said projection lens further having a field curvature coincident with the surface of said screen to project the image produced on said output surface onto the elliptical surface of the viewing screen.

6. The installation as defined in claim 1 wherein said wide angle lens and image intensification means input and output surfaces are optically coupled and positioned between said hyperbolic image collector and said projection means, with said lens relaying the virtual image on the hyperbolic mirror to the input surface of said intensification means, wherein said intensification means electronically amplifies the brightness of the incoming image and displays said image on the output surface thereof.

7. An image viewing device providing a real time display comprising, a reflector, said reflector creating a transformed virtual image, whereby horizontally viewed objects are transformed to appear as curved images in said reflector concentric about its center, and vertical objects viewed appear as radial images, wide angle lens means having its optical center coincident with the outer focus of said reflector whereby said wide angle lens transforms the virtual image to a real image and reduces the image in size, light amplifier means optically coupled to said wide angle lens with said light amplifier means viewing said reduced real image projected by said wide angle lens and transmitting said reduced image to a projection lens, said projection lens having a focal length equal to the focal length of said wide angle lens for projecting said real image to a viewing means of an elliptical configuration having its outer focus coincidental with the optical center and field curvature of said projection lens, thereby preventing distortion of the real image.

References Cited by the Examiner

UNITED STATES PATENTS 1,616,279  1/1927  Parodi _____ 88—72 X

FOREIGN PATENTS 447,177  12/1911  France.
283,493  4/1915  Germany.
10,701  8/1907  Great Britain.
15,188  6/1909  Great Britain.

JEWELL H. PEDERSEN, *Primary Examiner.*

J. L. CHASKIN, R. L. WIBERT, *Assistant Examiners.*